United States Patent [19]

Thiele

[11] Patent Number: 5,462,637
[45] Date of Patent: Oct. 31, 1995

[54] PROCESS FOR FABRICATION OF THIN FILM MAGNETIC HEADS

[75] Inventor: Martin Thiele, Spiesheim, Germany

[73] Assignee: International Business Machines Corporation, Armonk, N.Y.

[21] Appl. No.: 231,074

[22] Filed: Apr. 22, 1994

[30] Foreign Application Priority Data

Jul. 22, 1993 [EP] European Pat. Off. ............ 93111723

[51] Int. Cl.⁶ .................. B44C 1/22; C23F 1/02
[52] U.S. Cl. ................ 216/22; 216/41; 360/126
[58] Field of Search ................ 156/643, 652, 156/653, 656, 659.1, 661.1, 667; 29/603; 427/130, 131, 132; 360/110, 119–122, 126, 127; 204/192.11, 192.12, 192.3, 192.31, 192.32, 192.34, 192.35, 192.02; 216/22, 41

[56] References Cited

U.S. PATENT DOCUMENTS

| | | | |
|---|---|---|---|
| 4,791,719 | 12/1988 | Kobayashi et al. | 29/603 |
| 4,841,624 | 6/1989 | Togawa et al. | 156/656 X |
| 5,200,056 | 4/1993 | Cohen et al. | 156/661.1 |

FOREIGN PATENT DOCUMENTS

| | | | |
|---|---|---|---|
| 62-146418 | 6/1987 | Japan | G11B 5/31 |
| 1-14710 | 1/1989 | Japan | G11B 5/31 |
| 1-067708 | 3/1989 | Japan | G11B 5/31 |
| 51-14121 | 5/1993 | Japan | G11B 5/39 |

OTHER PUBLICATIONS

Anonymous, "Improved Overcoat Technique for Thin Heads", Research Disclosure, Mar. 1987, No. 275, p. 146.

Primary Examiner—William Powell
Attorney, Agent, or Firm—Ingrid M. Foerster

[57] ABSTRACT

A process for the fabrication of thin film magnetic heads from a wafer is disclosed that provides improved stud adhesion, reduced risk of contamination, and elimination of corrosive elements along the magnetic pole tips. The process includes the steps of forming a first pole tip, forming simultaneously a second pole tip, lead straps and a layer at each stud location from plated pole tip material; applying a thin overcoat layer to the wafer; applying a first mask with an opening over each stud; removing the overcoat material in each opening with a noncorrosive etchant to expose the stud layer; removing the mask; applying a NiFe seed layer to the wafer; applying a second mask to the wafer having an opening over each stud slightly larger than that of the first mask; plating gold into each opening; and removing the second mask and the remaining seed layer.

54 Claims, 3 Drawing Sheets

PROCESS FOR FABRICATION OF THIN FILM MAGNETIC HEADS

FIELD OF THE INVENTION

The present invention is concerned with a process for the fabrication of thin film magnetic heads, and more particularly with a new stud design for such heads.

BACKGROUND OF THE INVENTION

Thin film magnetic heads are primarily used in magnetic storage systems to write/read information in the form of magnetic pulses to/from a relatively moving magnetic medium. A magnetic transducer such as an inductive or magnetoresistive (i.e., MR) head is typically formed on a slider which is then mounted to a suspension arm of an actuator. The suspension arm suspends the head in close proximity to a disk surface.

Head supporting sliders are generally fabricated from a thin wafer of substrate including a matrix of thin film magnetic heads formed on one of the wafer surfaces. A number of known fabrication techniques may be used to form the heads, e.g. , sputtering, vapor deposition and plating. The particular processes used will depend on the type of head being constructed, but generally each process includes a stage wherein terminal pads or studs are formed at the slider's trailing edge for providing an electrical contact to the head element. For example, the formation of an inductive head can be separated into four stages: the construction of the first magnetic pole; formation of the conductor coil; construction of the second magnetic pole; and formation of the electrical conductors (studs). Four terminal pads or studs are usually required for each head. Upon completion of the studs, wafers are sliced and diced by known methods to form individual sliders. The sliders are then bonded to suspension arms, and leads from the suspension are soldered to the studs. Relatively large conductors are used in thin film heads to provide desired characteristics of mechanical stability, chemical stability and low contact resistivity.

According to previous methods, two different stud design types are commonly used in the fabrication of thin film heads. A first design comprises full gold studs. As the second pole tips of the magnetic heads are formed on a wafer, a layer of pole tip material is simultaneously applied at each stud location to form a first stud layer. Copper lead straps for coupling the magnetic head and terminal pads are applied next, forming a second stud layer. A NiFe seed layer is applied to the Cu layer of each stud, and a thick gold layer is plated to the NiFe using RISTON®, a commercially available dry photoresist. The wafer is coated with a thick layer of alumina. The alumina "overcoat" is then lapped to expose the coated studs and to planarize the wafer surface.

A number of problems arise using the full gold stud design just described. For instance, use of a photoresist such as RISTON® causes capillaries to form along the thin film head structure because the resist is laminated rather than spun onto the wafer. Etching solution seeps into the capillaries, forming holes in the overcoat layer along the pole tip structure. Another problem occurs when the gold plating solution contains thallium as a grain refiner. The thallium aggregates at the NiFe/Au interface, weakening the bonding strength of the two metals. This condition leads to stud "pullout" when moderate thermal stress is applied to the exposed stud surface.

The second commonly used stud design comprises a thick Cu layer and a thin Au layer. As the second pole tip of the magnetic head is formed, a layer of pole tip material is applied at each stud location to form a first stud layer. Formation of Cu lead straps provides the next stud layer. A second, thick Cu layer is applied to each stud area using a spin-coated liquid photoresist. The wafer is then coated with a thick alumina overcoat which is lapped to planarize the wafer surface and to expose the copper studs. A thin gold layer is applied to each stud, again using a spun-on liquid photoresist. The gold layer studs are then lapped.

Although Cu/Au studs overcome some problems associated with full gold studs, they introduces other disadvantages. For example, more process steps are required to implement this design alternative. In addition, the number of metal interfaces and combinations are more complex. Application of each metal layer requires processing steps that increase risk of contamination (e.g., sputter deposition, photolithography, plating and etching). Contamination leads to degradation of bonding strength between layers.

Another problem arises from the use of liquid photoresists. Since the thickness or height of the thick second copper layer generally exceeds the height of the developed photoresist, the copper layer tends to "mushroom" at the point where the photoresist "wall" ends. The stud is therefore structurally weak at its base and may crack during lead bonding. When the resist is removed and the alumina overcoat is applied, the "neck" of the mushroom-shaped Cu structure remains uncoated. Such buried cavities can reduce head reliability if minor cracks in the alumina oxide appear and permit corrosive humidity to enter the space.

It is also possible for the Cu to be exposed even after gold plating, resulting in corrosion in the presence of humidity. The thick copper layer requires a copper seed layer as a plating base. The seed layer must be removed after plating and before application of the NiFe seed layer by using a sputter etch technique. Sputter etching, however, causes some of the copper to redeposit at the second pole tip structure, leading to corrosion at the resulting Cu/NiFe interface.

In either stud design described, a thick alumina overcoat is required to overcome topology differences between the thin film head and the studs. Deposition of a thick overcoat may have a duration of more than 16 hours since the deposition rate of alumina is low. Moreover heating temperatures during deposition may reach temperatures exceeding 120° C. Consequently, the wafers are thermally stressed, resulting in a degradation of overall magnetic behavior, particularly in the production of MR heads.

What is needed is a process for forming electrical conductors that overcomes the problems of contamination, overcoat damage, stud adhesion failure, corrosion and degradation of magnetic properties without substantially adding to the complexity or cost of head production.

SUMMARY OF THE INVENTION

It is, therefore, an object of the present invention to provide an improved process for forming studs in the fabrication of thin film magnetic heads, thereby overcoming a number of problems associated with presently known fabrication methods.

In particular, it is an object of the present invention to provide a simple, low cost process for forming studs without problems of contamination, overcoat damage, stud adhesion failure, corrosion and degradation of head quality.

In accordance with the foregoing objectives, first and second pole tips are plated to a wafer of substrate. A lead strap providing the first layer of each stud is formed simultaneously with the second pole tip from either a metal or alloy film, preferably NiFe. The entire pole tip structure is covered with a thin overcoat of alumina. A first photoresist having an opening over each stud is used to remove a portion of the overcoat, exposing a surface of lead strap material. The photoresist is removed and a NiFe seed layer is applied to the highly cleaned stud surface. A second photoresist is applied, having an opening over each stud having a larger perimeter than the opening of the preceding resist. The second resist forms a mold in which a subsequent gold layer is plated. The resist is then removed, providing a gold stud having excellent bonding characteristics and improved mechanical stability against bonding pressure. Overcoat deposition time and thermal stress is drastically decreased due to reduced overcoat thickness.

The present invention allows better stud adhesion due to the reduction of interfaces. In addition, the elimination of Cu seed layer to form the thick copper layer avoids the redeposition of Cu along the second pole and subsequently the formation of a corrosive element during slider lapping. Finally, the need to planarize the surface is eliminated, since a stud pattern etched into the thin overcoat layer is completely filled with gold later in the process.

BRIEF DESCRIPTION OF THE DRAWINGS

The invention will be described in more detail hereinafter with respect to the accompanying drawings in which:

FIG. 1 (b) is a representation of four interfaces formed by the five layers of material present in each stud such as those shown in FIG. 1 (a);

DETAILED DESCRIPTION OF THE PREFERRED EMBODIMENT

Figure 1A:
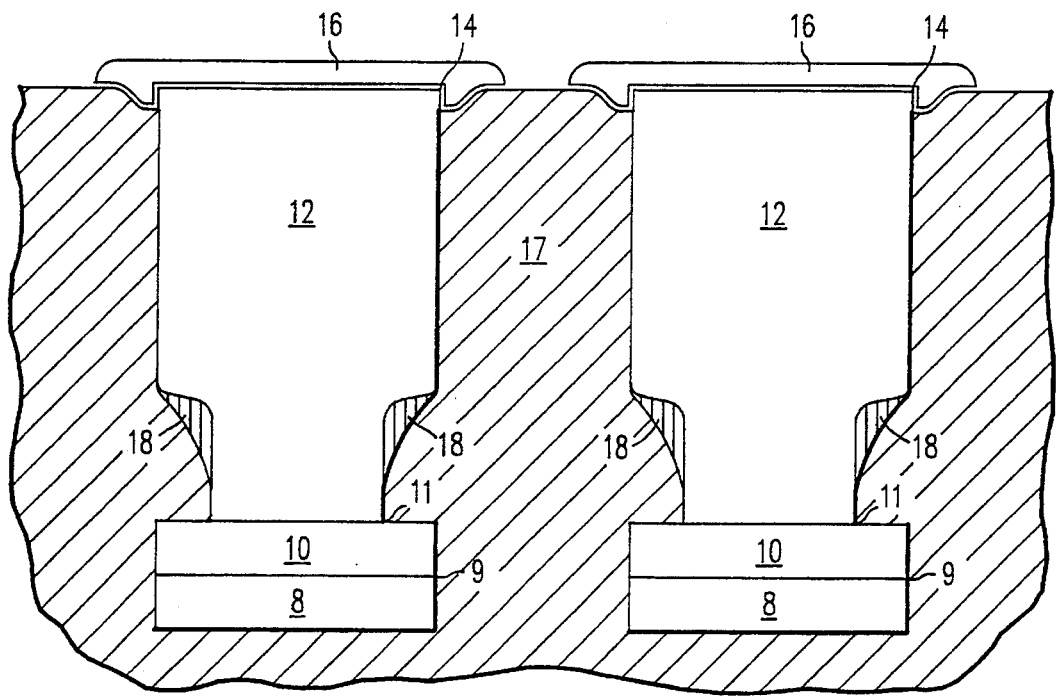
FIG. 1 (a) is a cross sectional view of adjacent studs formed in a wafer according to a previously used Cu/Au stud fabrication process.
Figure 1B:
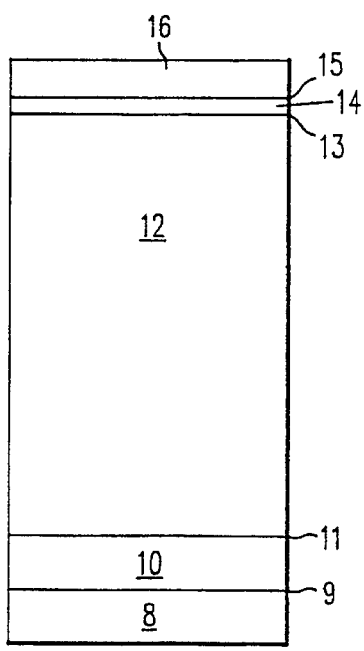
Figure 2:
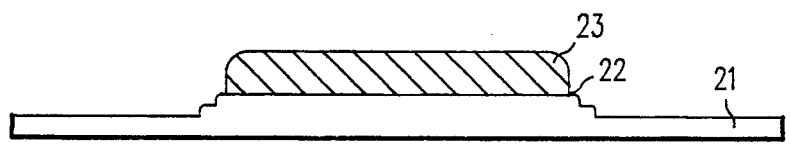
FIGS. 2–6 show a schematic sequence of steps of the process according to the present invention.

FIGS. 1 and 2 illustrate the formation of a stud according to a previously used Cu/Au stud fabrication process. A first stud layer 8 typically comprising about 4 µm of NiFe is formed on a wafer concurrently with the formation of the second pole tips. Next, a Cu seed layer is applied to the NiFe by known methods such as RF sputtering. A subsequent layer of Cu is plated to the seed layer to form lead straps. The lead straps serve to electrically couple the terminal pads to the magnetic head, and provide a second stud layer 10. The NiFe/Cu boundary forms a first stud interface 9 exposed to contamination. A second Cu layer 12 typically 35 µm in thickness is formed on each stud by applying a photoresist to the previous Cu layer, developing the resist to form a pattern, plating a layer of Cu, and removing the resist. The steps required to form the second Cu layer 12 provide an opportunity for contamination at the Cu/Cu interface 11. A thin NiFe layer 14 is sputtered onto the Cu layer 12 as a seed layer for plating a subsequent layer of Au 16. Thus two additional interfaces 13, 15 at risk of contamination are created at the Cu/NiFe and NiFe/Au boundaries.

Figure 3:
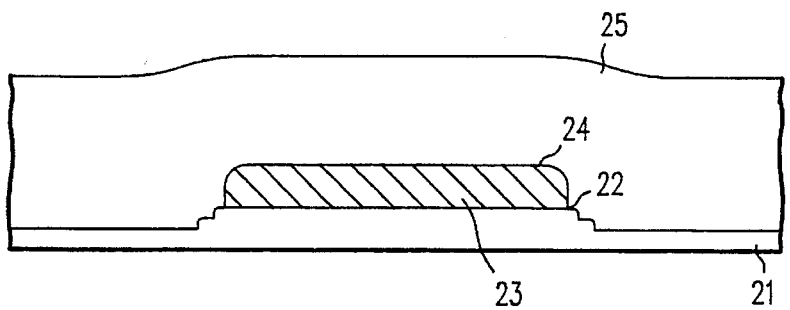

Referring to FIGS. 2–6, the stud fabrication process of the present invention will now be described. A single stud is shown in these figures. During the completion of the second pole tips of a wafer, a layer of pole tip material 21 such as NiFe is formed at each stud location. At that time, flags or lead straps are also formed to provide an electrical connector between the pole and corresponding studs. The lead strap material is plated to each stud location to form a second stud layer. Preferably, the lead straps comprise NiFe. In this preferred embodiment, the first and second stud layers are actually a single homogeneous layer formed concurrently with the second pole tip. Alternatively, materials such as Cu may be used, requiring a Cu seed layer to be applied on the NiFe layer 21 prior to lead strap plating as in previously used methods. The flag layer 23 and pole tip material 21 are then covered with a thin overcoat 25 of nonconductive material such as aluminum oxide, as shown in FIG. 3. The layer has a thickness, e.g., of about 5 to 20 µm, preferably 15 µm and is applied by a suitable method such as RF sputtering. Due to the reduced thickness of the overcoat layer over prior art methods, deposition time is substantially decreased, e.g., from about 16 hours to about 4 hours.

Figure 4:
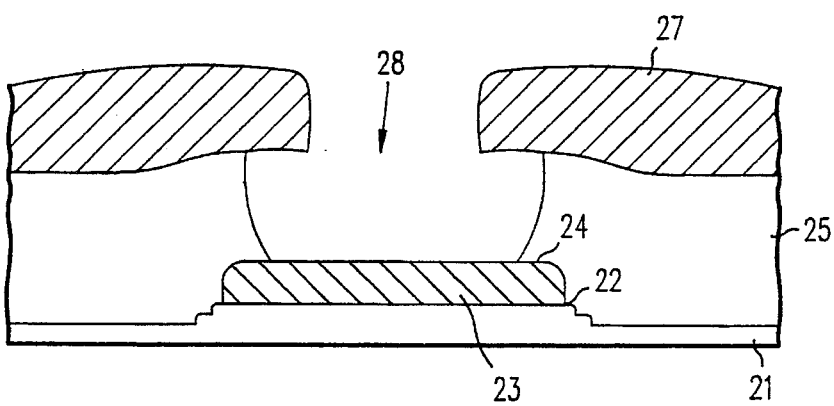
Figure 5:
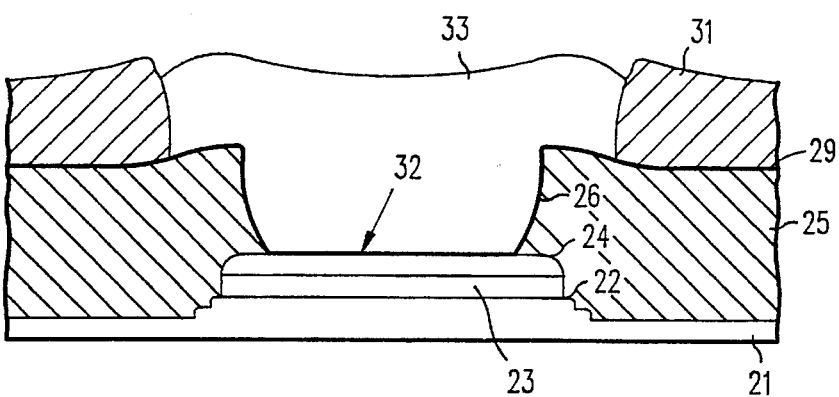

Referring next to FIG. 4, a first photoresist 27 is applied to the aluminum overcoat and developed to form a first mask having an opening over each stud. Preferably, a positive photoresist such as AZ 1375® or AZ 1529® is used. The thickness of the applied resist is, e.g., between 4 µm and 7 µm, preferably 5 µm. It should be understood, however, that other appropriate masking techniques may be utilized.

Next, openings 28 are etched into the overcoat layer 25 to expose the flag layer 23 of each stud. Preferably, a mixture of NaOH and EDTA (ethylene diamine tetra acetic acid) is used as the etchant. A suitable mixture is, e.g., 10–15 g/L NaOH+20–100 g/L $Na_2EDTA \cdot 2H_2O$. The etch rate depends on the pH and temperature. This solution has been shown to be very stable and safe at a pH of 11 and a temperature of about 25°–60° C. It therefore does not attack the flag 23, which is made of a metal film or an alloy film. Using these conditions, the etch rate is about 150 nm/min but can be easily increased to 200 nm/min. A good adhesion between the flag 23 and the following gold layer are also assured, since the exposed flag surface is highly cleaned and does not corrode during etching.

After exposing and developing the first photoresist and after overcoat etching, a NiFe seed layer 29 is applied onto the cleaned surface of the opening to act as electrical contact layer for the next plating step. See FIG. 5. Preferably, the layer 29 is RF sputtered, although other deposition methods may be used. The thickness of the seed layer lies, e.g., between 60 nm and 100 nm and is preferably about 80 nm.

Next, a second photoresist 31 is provided, exposed and developed by using a mask having a slightly larger opening over each stud than the first photoresist. Preferably, a positive photoresist such as commercially available AZ 1440® or AZ 4562® is used and has a thickness of between 4–10 µm. However, other suitable masking techniques may be employed.

Subsequently, a thin gold layer 33 is applied to the mask openings by a suitable method such as electroplating. The thickness of the gold layer lies, e.g., in the range of 5 µm to 25 µm, and is preferably 9 to 10 µm.

Figure 6:
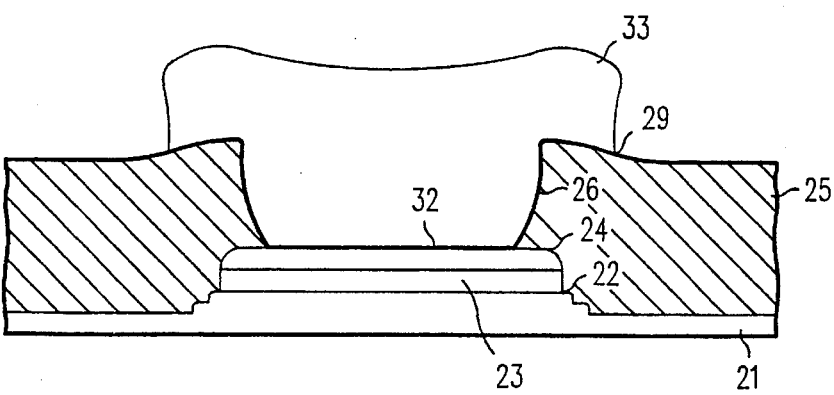

Referring to FIG. 6, the resist 31 is stripped and the NiFe seed layer 29 is etched away by using a vacuum dry etch process. Sputter etching is the preferred method, but other suitable methods may be employed. After etching, the wafer fabrication is essentially finished, and the individual sliders may be sliced and diced from the wafer according to conventional methods known to those of ordinary skill in the art.

Figure 7:
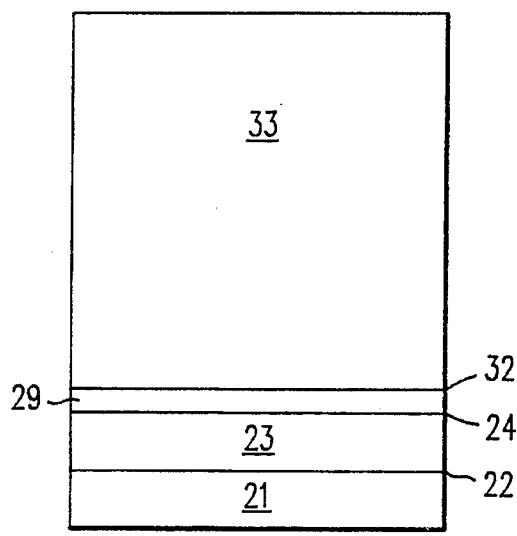
FIG. 7 is a representation of three interfaces created by four layers of material in a stud formed according to the method of the present invention.

The new gold conductor stud process addresses the major issues mentioned above, i.e., mechanical stability, chemical stability and low contact resistivity. FIG. 7 represents the interfaces present between the second pole tip material 21 and the gold layer 33 resulting from the disclosed process. A first interface 22 is created between layer 21 and flag layer 23. A second interface 24 is created when the NiFe seed layer 29 is applied. The seed layer also forms a third interface 32 with the plated Au layer 33. Thus three interfaces 22,24,32 result from the disclosed process. Reduction in the number of interfaces, elimination of a thick copper stud layer, and use of non-corrosive etch solutions (e.g., NaOH/EDTA) overcomes the problem of stud adhesion failure due to the material combination used in the past (NiFe/Cu/Cu/NiFe/Au). Moreover, reducing the number of interfaces from four to three reduces the risks of contamination proportionally. It should be understood that alternative noncorrosive etch solutions may be substituted without departing from the spirit and scope of the invention.

Figure 8:
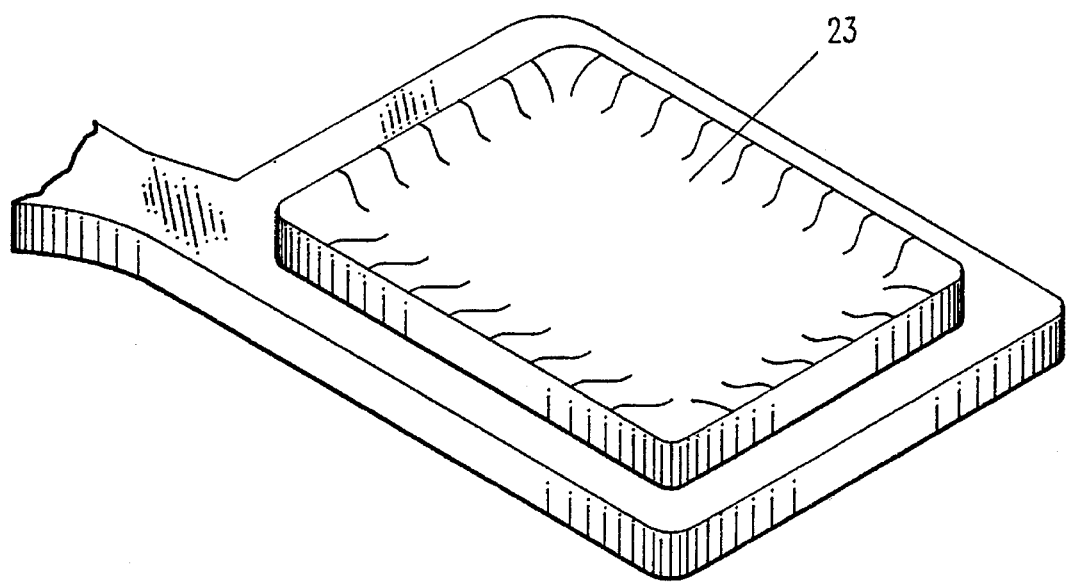
FIG. 8 is a schematic top down view of a stud after completion according to the present invention.

As noted above, in former processes, thick copper studs created mushrooming in the overcoat around the structure in which the plated copper is not completely surrounded by $Al_2O_3$. With the disclosed process, the gold stud structure fits perfectly in the mask opening, as shown in FIG. 8, and no mushrooming problems are observed.

Also noted above, in known full gold processes grain refiners such as thallium or cobalt would aggregate at the NiFe/Au interface, causing adhesion failure. In the process now proposed, however, the grain refiner concentration is low, because, e.g., only 5 to 15 μm Au and only NiFe seed is used which has about the same element structure as Au for perfect adhesion. Moreover, since no copper is used no copper redeposition or copper initiated corrosion will occur.

Finally, since the NiFe seed layer is sputter etched away, a highly cleaned stud surface results, so that surface lapping is no longer necessary.

I claim:

1. A process for fabricating a thin film magnetic head structure on a wafer, said structure including a plurality of studs, comprising the steps of:

forming a first and a second magnetic pole tip comprising a first conductive material;

forming a first stud layer comprising said first conductive material at each of a plurality of stud locations on said wafer;

forming a second stud layer comprising a second conductive material over said first stud layer at each of said stud locations;

covering said wafer with a layer of nonconductive material;

applying a first mask to said wafer, said first mask having a plurality of openings, each opening disposed over one of said stud locations;

removing said nonconductive material at each opening to expose a portion of said second stud layer at each of said stud locations;

applying a seed layer of a third conductive material on said nonconductive layer and said exposed portions;

applying a second mask to said wafer, said second mask having a plurality of openings, each opening disposed over one of said stud locations;

applying a layer of a fourth conductive material in each of said openings of said second mask; and removing said seed layer from said nonconductive layer.

2. The fabrication process of claim 1, wherein said first conductive material comprises NiFe.

3. The fabrication process of claim 1, wherein said second conductive material comprises NiFe.

4. The fabrication process of claim 1, wherein said first and second conductive materials comprise NiFe, and wherein said first and second stud layers comprise a single homogeneous layer formed simultaneously with the formation of said second pole tip.

5. The fabrication process of claim 1, wherein said second conductive material comprises Cu.

6. The fabrication process of claim 1, wherein said first conductive material comprises NiFe, said second conductive material comprises Cu, and said second stud layer is formed after the formation of said second pole tip.

7. The fabrication process of claim 1, wherein said first stud layer is formed by electroplating.

8. The fabrication process of claim 1, wherein said second stud layer is formed by electroplating.

9. The fabrication process of claim 1, wherein said nonconductive material comprises aluminum oxide.

10. The fabrication process of claim 1, wherein said nonconductive layer has a thickness in the range of 5–20 μm.

11. The fabrication process of claim 1, wherein said nonconductive layer is applied by sputter deposition.

12. The fabrication process of claim 1, wherein applying a first mask further comprises the steps of:

applying a positive photoresist to said nonconductive layer, said photoresist having an plurality openings, each opening disposed over one of said stud locations; and exposing and developing said photoresist.

13. The fabrication process of claim 12, wherein said positive photoresist has a thickness in the range of 4–10 μm.

14. The fabrication process of claim 1, wherein removing said nonconductive material further comprises etching away said nonconductive layer at each opening with a noncorrosive etchant.

15. The fabrication process of claim 14, wherein said noncorrosive etchant comprises a mixture of NaOH and EDTA is used to etch said nonconductive layer.

16. The fabrication process of claim 15, wherein said mixture comprises between 10 and 15 g/L NaOH+between 20 and 100 g/L $Na_2EDTA- 2H_2O$.

17. The fabrication process of claim 14, wherein said etchant has a pH of 11 and a temperature in the range of 25°–60° C.

18. The fabrication process of claim 1, wherein applying said second mask further comprises the steps of:

applying a positive photoresist to said nonconductive layer, said mask having a plurality of openings, each opening disposed over one of said stud locations; and exposing and developing said photoresist.

19. The fabrication process of claim 18, wherein said positive photoresist has a thickness in the range of 4–10 μm.

20. The fabrication process of claim 1, wherein said third conductive material comprises NiFe.

21. The fabrication process of claim 1, wherein said seed layer is applied by sputter deposition.

22. The fabrication process of claim 1, wherein said seed layer has a thickness in the range of 60–100 nm.

23. The fabrication process of claim 1, wherein said fourth conductive material comprises gold.

24. The fabrication process of claim 1, wherein said fourth conductive material is applied by electroplating.

25. The fabrication process of claim 1, wherein said fourth conductive material has a thickness in the range of 5–15 μm.

26. The fabrication process of claim 1, wherein said seed layer is removed using a vacuum dry etch process.

27. The fabrication process of claim 26 wherein said vacuum dry etch process comprises sputter etching.

28. A thin film magnetic head structure formed on a wafer, said structure including a plurality of studs, formed according to a process comprising the steps of:

forming a first and a second magnetic pole tip comprising a first conductive material;

forming a first stud layer comprising said first conductive material at each of a plurality of stud locations on said wafer;

forming a second stud layer comprising a second conductive material over said first stud layer at each of said stud locations;

covering said wafer with a layer of nonconductive material;

applying a first mask to said wafer, said first mask having a plurality of openings, each opening disposed over one of said stud locations;

removing said nonconductive material at each opening to expose a portion of said second stud layer at each of said stud locations;

applying a seed layer of a third conductive material on said nonconductive layer and said exposed portions;

applying a second mask to said wafer, said second mask having a plurality of openings, each opening disposed over one of said stud locations;

applying a layer of a fourth conductive material in each of said openings of said second mask; and removing said seed layer from said nonconductive layer.

29. The structure of claim 28, wherein said first conductive material comprises NiFe.

30. The structure of claim 28, wherein said second conductive material comprises NiFe.

31. The structure of claim 28, wherein said first and second conductive materials comprise NiFe, and wherein said first and second stud layers comprise a single homogeneous layer formed simultaneously with the formation of said second pole tip.

32. The structure of claim 28, wherein said second conductive material comprises Cu.

33. The structure of claim 28, wherein said first conductive material comprises NiFe, said second conductive material comprises Cu, and said second stud layer is formed after the formation of said second pole tip.

34. The structure of claim 28, wherein said first stud layer is formed by electroplating.

35. The structure of claim 28, wherein said second stud layer is formed by electroplating.

36. The structure of claim 28, wherein said nonconductive material comprises aluminum oxide.

37. The structure of claim 28, wherein said nonconductive layer has a thickness in the range of 5–20 μm.

38. The structure of claim 28, wherein said nonconductive layer is applied by sputter deposition.

39. The structure of claim 28, wherein applying a first mask further comprises the steps of:

applying a positive photoresist to said nonconductive layer, said photoresist having a plurality of openings, each opening disposed over one of said stud locations; and exposing and developing said photoresist.

40. The structure of claim 39, wherein said positive photoresist has a thickness in the range of 4–10 μm.

41. The structure of claim 28, wherein removing said nonconductive material further comprises etching away said nonconductive layer at each opening with a noncorrosive etchant.

42. The structure of claim 41, wherein said noncorrosive etchant comprises a mixture of NaOH and EDTA is used to etch said nonconductive layer.

43. The structure of claim 42, wherein said mixture comprises between 10 and 15 g/L NaOH+between 20 and 100 g/L $Na_2EDTA-2H_2O$.

44. The structure of claim 42, wherein said etchant has a pH of 11 and a temperature in the range of 25°–60° C.

45. The structure of claim 28, wherein applying said second mask further comprises the steps of:

applying a positive photoresist to said nonconductive layer, said mask having a plurality of openings, each opening disposed over one of said stud locations; and exposing and developing said photoresist.

46. The structure of claim 45, wherein said positive photoresist has a thickness in the range of 4–10 μm.

47. The structure of claim 28, wherein said third conductive material comprises NiFe.

48. The structure of claim 28, wherein said seed layer is applied by sputter deposition.

49. The structure of claim 28, wherein said seed layer has a thickness in the range of 60–100 nm.

50. The structure of claim 28, wherein said fourth conductive material comprises gold.

51. The structure of claim 28, wherein said fourth conductive material is applied by electroplating.

52. The structure of claim 28, wherein said fourth conductive material has a thickness in the range of 5–15 μm.

53. The structure of claim 28, wherein said seed layer is removed using a vacuum dry etch process.

54. The fabrication process of claim 26, wherein said vacuum dry etch process comprises sputter etching.

* * * * *